March 8, 1949.  J. TEAGUE  2,463,654
COMBINATION BUMPER AND AXLE JACK FOR VEHICLES
Filed Feb. 25, 1947  2 Sheets-Sheet 1
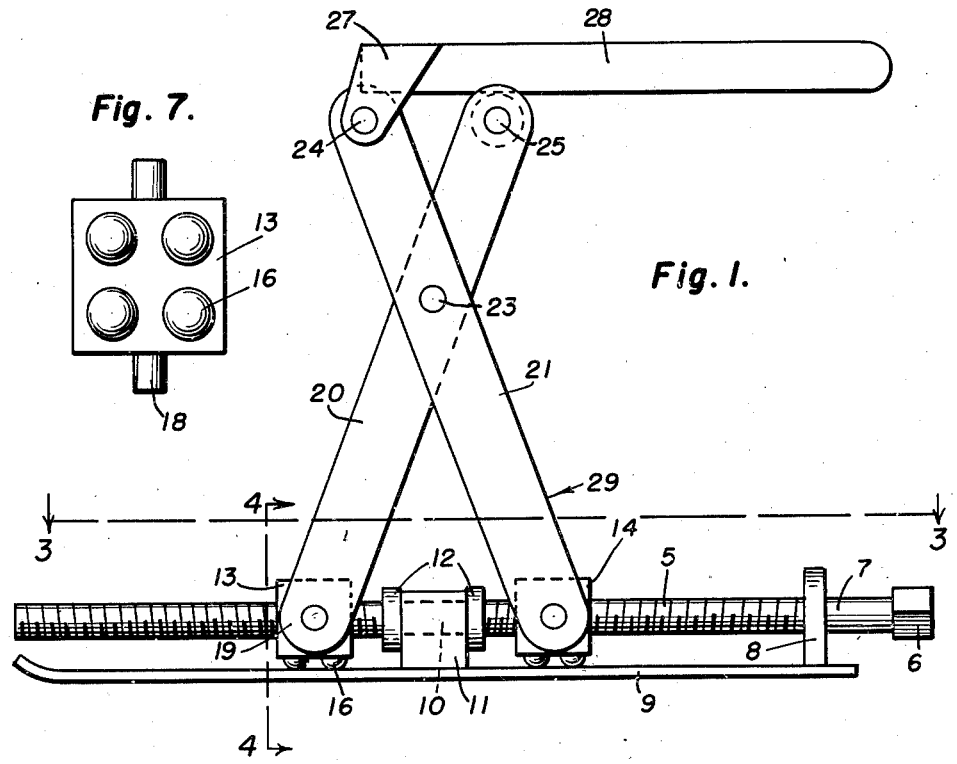
Fig. 7.
Fig. 1.
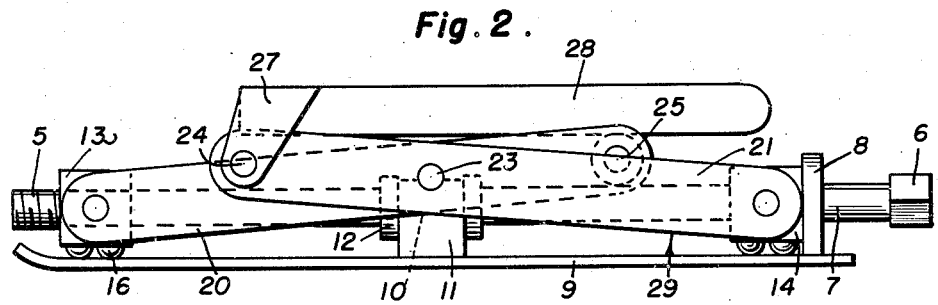
Fig. 2.
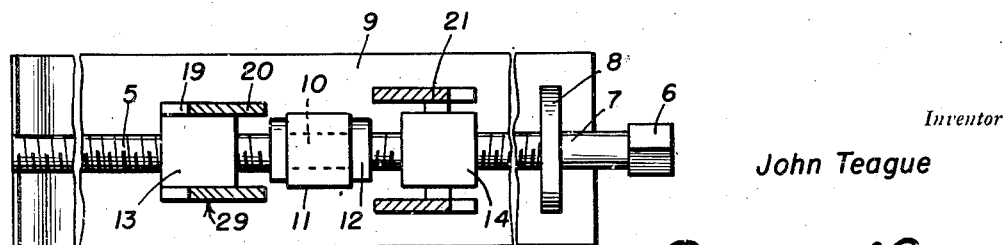
Fig. 3.
Inventor
John Teague
By Clarence A. O'Brien
and Harvey B. Jacobson
Attorneys March 8, 1949.  J. TEAGUE  2,463,654
COMBINATION BUMPER AND AXLE JACK FOR VEHICLES
Filed Feb. 25, 1947  2 Sheets-Sheet 2
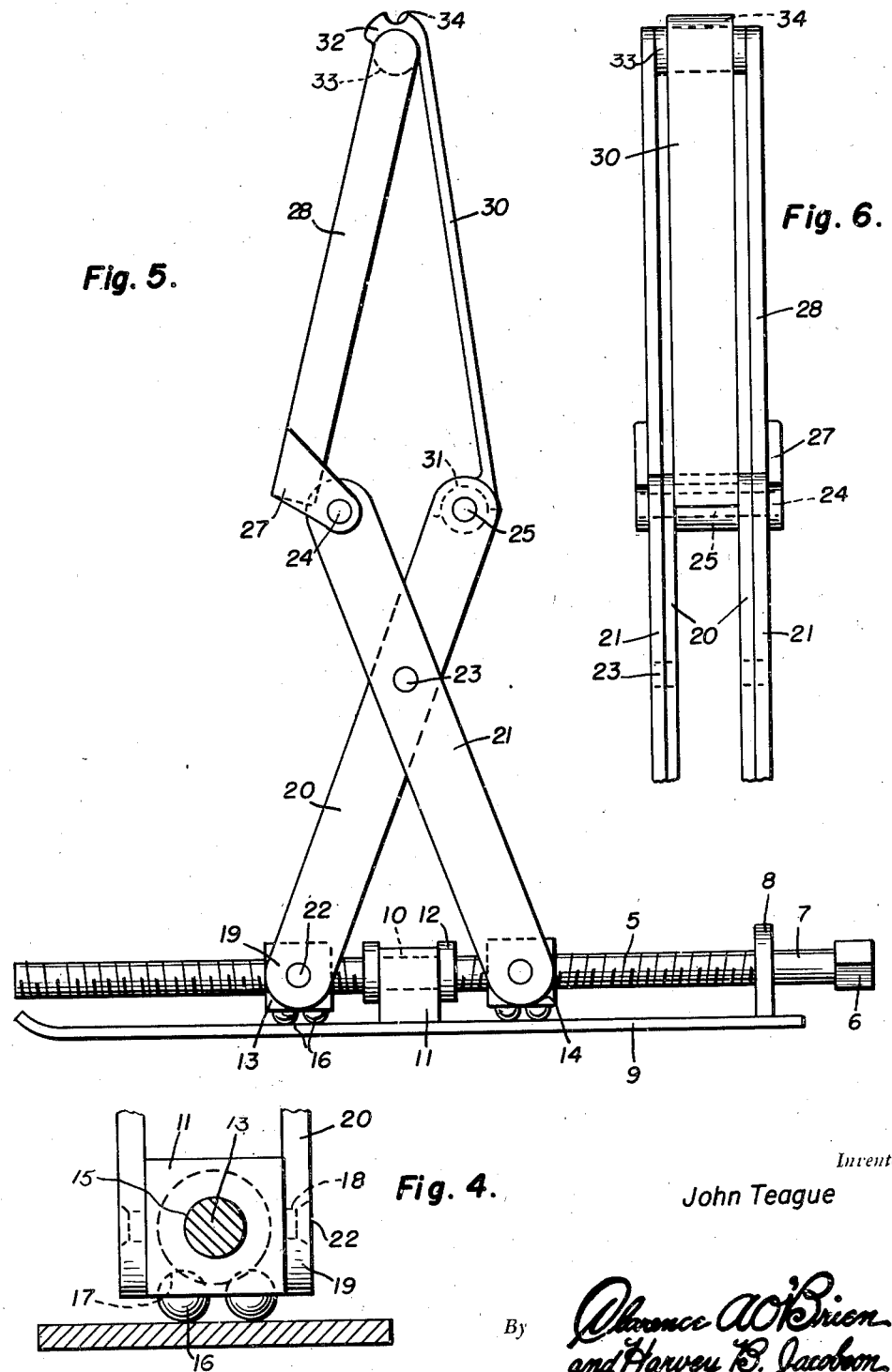
Inventor
John Teague
By Clarence A. O'Brien
and Harvey B. Jacobson
Attorneys Patented Mar. 8, 1949

2,463,654

UNITED STATES PATENT OFFICE 2,463,654

COMBINATION BUMPER AND AXLE JACK FOR VEHICLES

John Teague, Frackville, Pa.

Application February 25, 1947, Serial No. 730,721

2 Claims. (Cl. 254—126)

This invention relates to new and useful improvements in vehicle jacks and more particularly to a combination jack adapted for application to a vehicle bumper or the axle of said vehicle.

The primary feature of the present invention is to provide a jack of the character referred to that is easily converted from a bumper jack to an axle jack by the simple attachment of a removable arm.

Another important feature of this invention is to provide a device adapted for raising vehicles that is quickly set in place in a minimum of time and occupies very little space when in a collapsed form for shipment or storing thereof.

A further feature of the present invention is to provide a simply constructed lazytong structure which is quite cheap to manufacture.

A still further feature of the present invention is to provide a combination bumper and axle jack for vehicles that is strong and durable in construction, efficient and reliable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the device constructed in accordance with the present invention shown in use as an axle jack in a raised position.

Figure 2 is a side elevational view thereof in a lowered position.

Figure 3 is a fragmentary sectional view taken on line 3—3 of Figure 1.

Figure 4 is an enlarged sectional view taken on line 4—4 of Figure 1.

Figure 5 is a side elevational view of the device shown in use as a bumper jack.

Figure 6 is a fragmentary front elevational view thereof.

Figure 7 is an enlarged bottom plan view of one of the traveling blocks.

Referring now to the drawings in detail wherein for the purpose of illustration, I have disclosed a preferred embodiment of the present invention, the numeral 5 represents a horizontally positioned threaded screw having a preferably hexagonal head 6 adapted to receive a usual lug wrench (not shown).

One smooth surfaced end 7 of the screw is loosely journaled in a fixed end bearing block 8 extending upwardly from one edge of an elongated base plate 9, and the smooth surfaced central portion 10 of said screw is loosely journaled in a supporting center bearing block 11 fixed to the central portion of said base plate.

A pair of washers 12 suitably secured on screw 5 on either face of center bearing block 11 prevents longitudinal movement of said screw and the screw is oppositely threaded from said washers.

A pair of traveling blocks 13 and 14 having threaded bores 15 through which the screw 5 extends are adapted to travel in opposite directions on said screw as the head of the screw is rotated, and ball bearings 16 loosely carried in concave recesses 17 in the lower face of said traveling blocks 13 and 14 project outwardly slightly therefrom to contact base plate 9 to aid in a longitudinal movement of said blocks 13 and 14.

Projecting outwardly from the sides of said traveling blocks are trunnions 18 which extend through the eye ends 19 of pairs of arms 20 and 21 and the trunnions are then flattened flush against the outer face of said arms as at 22 to provide a pivotal connection between said arms and the blocks.

The pairs of arms 20 and 21 cross each other and are pivotally connected at their junction as at 23 whereby the arms may be lowered downwardly toward the base as shown in Figure 2 when the device is not in use or when the device is first inserted under a vehicle axle to be raised.

Connecting the upper ends of said pairs of arms 20 and 21 are shafts 24 and 25, and journaled on shaft 24 are a pair of triangular tongues 27 fixed to one end of a small pair of pivotal arms 28.

Arms 28 are adapted to extend between shafts 24 and 25, loosely resting on shaft 25 for horizontal support of the arms in operation of the device as an axle jack.

The operation of the device as previously described is merely the function of a lazytong mechanism designated generally by the numeral 29 with the arms 28 bearing against the vehicle axle. As the screw is rotated the arms 28 are extended upwardly against the axle and raising the vehicle.

For use of the device as a bumper jack an additional arm 30 is added to the structure, said arm 30 terminating at one end into a semi-cylindrical bearing 31 which is adapted to conform to the periphery of shaft 25 for pivotal movement thereon.

The opposite end of said arm 30 terminates into an arcuate hook 32 turned in a like manner as bearing 31, said hook 32 adapted to conform to the upper periphery of a cross bar 33 extending between the free ends of the pair of arms 28 when said arms 28 are extended upwardly in a position shown in Figure 5 and a longitudinal recess 34 provided in hook 32 is adapted to comfortably seat a vehicle bumper.

As the screw head is rotated in one direction the upper ends of the pairs of arms 20 and 21 move toward each other causing the arms 28 and arm 30 to extend upwardly raising the vehicle by its bumper.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what I claim as new is:

1. A vehicle jack comprising a lazytong structure including pairs of upwardly extending pivotally connected crossed arms, a base, a feed screw journaled on the base, travelers movable longitudinally on the screw and to which the lower ends of the arms are pivoted, pivot members at the upper ends of said pairs of arms, a permanently attached arm pivoted at one end to one of said pivot members and extending upwardly therefrom, said last-named arm also having a pivot member at its upper end, and a removable arm having semi-circular lateral extensions at each end straddling respectively the other pivot member of said pairs of arms and the pivot member at the upper end of said permanently attached arm for pivotal movement on and quick detachment from the pivots straddled thereby.

2. A vehicle jack comprising a lazytong structure including pairs of upwardly extending pivotally connected crossed arms, a base, a feed screw journaled on the base, travelers movable longitudinally on the screw and to which the lower ends of the arms are pivoted, pivot members at the upper ends of said pairs of arms, a permanently attached arm pivoted at one end to one of said pivot members and extending upwardly therefrom, said last-named arm also having a pivot member at its upper end and a removable brace pivoted at its lower end to the other pivot member of said pairs of arms and hooked at its upper end over the upper end of said permanently attached arm for pivotal movement thereon and quick detachment therefrom, said hooked upper end having a notch therein for seating the bumper of an automobile.

JOHN TEAGUE.

REFERENCES CITED

The following references are of record in the file of this patent:

FOREIGN PATENTS

| Number | Country | Date |
| --- | --- | --- |
| 1,666 | Great Britain | 1909 |
| 153,904 | Switzerland | July 1, 1932 |
| 334,283 | Great Britain | Sept. 4, 1930 |